(12) United States Patent
Yukawa et al.

(10) Patent No.: US 7,886,789 B2
(45) Date of Patent: Feb. 15, 2011

(54) PNEUMATIC TIRE AND INTERFERENCE FIT NOISE DAMPER

(75) Inventors: Naoki Yukawa, Kobe (JP); Hidehiko Hino, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 972 days.

(21) Appl. No.: 11/733,006

(22) Filed: Apr. 9, 2007

(65) Prior Publication Data

US 2007/0175560 A1 Aug. 2, 2007

Related U.S. Application Data

(62) Division of application No. 11/076,058, filed on Mar. 10, 2005, now Pat. No. 7,213,624.

(30) Foreign Application Priority Data

| Mar. 10, 2004 | (JP) | ............................. 2004-067698 |
| Jul. 9, 2004 | (JP) | ............................. 2004-203590 |
| Jul. 28, 2004 | (JP) | ............................. 2004-220645 |

(51) Int. Cl.
   *B60C 1/00* (2006.01)
   *B60C 5/00* (2006.01)
   *B60C 19/00* (2006.01)
(52) U.S. Cl. ...................................... 152/450; 152/151
(58) Field of Classification Search ................. 152/450, 152/151
   See application file for complete search history.

(56) References Cited

U.S. PATENT DOCUMENTS

| 4,392,522 | A | * | 7/1983 | Bschorr | .................. 152/450 X |
| 4,399,851 | A | | 8/1983 | Bschorr | |
| 6,244,314 | B1 | * | 6/2001 | Dodt et al. | .............. 152/450 X |
| 6,726,289 | B2 | * | 4/2004 | Yukawa et al. | |
| 2005/0155686 | A1 | * | 7/2005 | Yukawa et al. | .............. 152/450 |
| 2005/0205183 | A1 | | 9/2005 | Yukawa | |

FOREIGN PATENT DOCUMENTS

| DE | 198 20 590 A1 | * | 11/1999 |
| DE | 199 26 039 A1 | * | 12/2000 |
| EP | 0166154 A | | 1/1986 |
| JP | 2004291855 A | * | 10/2004 |
| WO | WO-03/103989 A1 | * | 12/2003 |

* cited by examiner

*Primary Examiner*—Adrienne C Johnstone
(74) *Attorney, Agent, or Firm*—Birch, Stewart, Kolasch & Birch, LLP

(57) ABSTRACT

A noise damper disposed in a tire cavity formed by a pneumatic tire and wheel rim is disclosed. A noise damper designed to use with a wheel rim comprises an annular body disposed around a damper-mounting portion of the wheel rim, and the annular body is made of a spongy material having an inside diameter of from 0.9 to 1.10 times an outside diameter of the damper-mounting portion. A noise damper designed to use with a pneumatic tire comprises an annular body disposed in a tire hollow, and the annular body is made of a spongy material having an outside diameter of from 1.00 to 1.10 times the maximum inside diameter of the tire hollow.

5 Claims, 7 Drawing Sheets

PNEUMATIC TIRE AND INTERFERENCE FIT NOISE DAMPER

This present application is a Divisional of application Ser. No. 11/076,058, filed Mar. 10, 2005, now U.S. Pat. No. 7,213,624, issued May 8, 2007, which claims the benefits of Japanese Application No. 2004-067698, filed Mar. 10, 2004; Japanese Application No. 2004-203590, filed Jul. 9, 2004; and Japanese Application No. 2004-220645, filed Jul. 28, 2004, the above are incorporated herein in their entirety.

BACKGROUND OF THE INVENTION

The present invention relates to a noise damper disposed in a tire cavity formed by a pneumatic tire and wheel rim.

In recent years, as the mechanical noise from automobiles especially passenger cars is greatly reduced, pneumatic tires especially those for passenger cars are strongly required to reduce their noise. There are many factors, but a circumferential resonance of annular air in the tire cavity is one of major factors. Usually, a resonance peak occurs in a frequency range of from 50 to 400 Hz according to the tire size.

To reduce such a resonance noise, a noise damper made of a sponge-like material disposed in the tire cavity has been proposed in the U.S. Pat. Nos. 6,726,289 and 6,729,373.

When a strip of a sponge-like material is to be fixed to tire with adhesive, usually it is necessary to remove a mold release agent and buff the bonding face, otherwise a separation failure is caused at the ends of the strip. Thus, the working efficiency is not so good. If separated the strip is very liable to causes flutter during running, and the rotational balance of the tire is lost. The problems of flutter and rotational balance also arise in case of a damper loosely inserted around the wheel rim.

OBJECTS AND BRIEF SUMMARY OF THE INVENTION

It is therefore, an object of the present invention is to provide a noise damper which can be used substantially without such bonding operation, and the above-mentioned problems can be solved.

According to one aspect of the present invention, a noise damper is designed to use with a wheel rim, and comprises an annular body disposed around a damper-mounting portion of the wheel rim, wherein the annular body is made of a spongy material having an inside diameter of from 0.9 to 1.10 times an outside diameter of the damper-mounting portion.

According to another aspect of the present invention, a noise damper is designed to use with a pneumatic tire, and comprising an annular body disposed in a tire hollow, wherein the axial width of the annular body is constant or alternatively gradually decreases from the radially outer end towards the radially inner end, and the annular body is made of a spongy material having an outside diameter of from 1.00 to 1.10 times the maximum inside diameter of the tire hollow.

Therefore, owing to the elasticity of the spongy material, by simply putting the annular body around the rim or inserting it into the tire hollow, the damper can stay in place without the bonding operation. Further, as the damper is annular, there is no end, and there is no ends' separation.

Embodiments of the present invention will now be described in detail in conjunction with the accompanying drawings.

DESCRIPTION OF PREFERRED EMBODIMENTS

Figure 2:
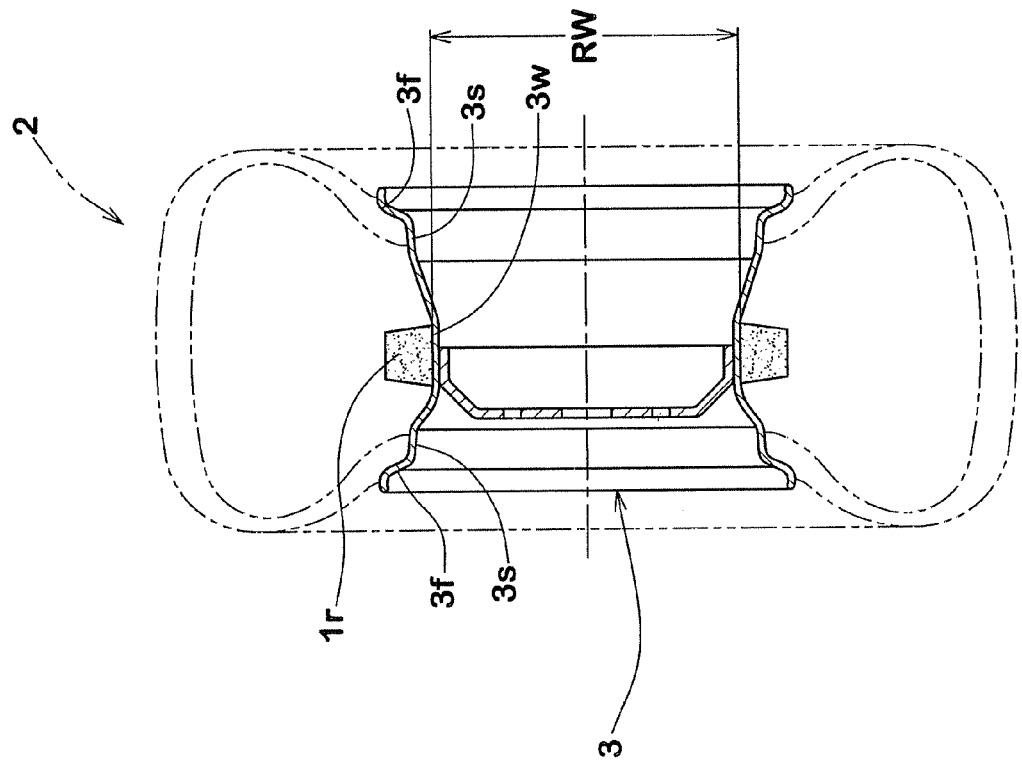
FIG. 2 is a cross-sectional view of an assembly of a wheel rim and the rim damper mounted thereon taken along a plane including its rotational axis.

According to the present invention, at least one noise damper 1, 1t, 1r is disposed in a tire cavity 5. The major task of the noise damper is to control air resonance in the tire cavity and to damp unwanted audible frequency vibration occurring on the tire 2 and/or a vehicle wheel 3 on which the tire is mounted. Thus, the target tires are mainly pneumatic tires for passenger cars. Incidentally, a tire cavity 5 is a closed space formed by mounting a pneumatic tire on a wheel rim and filled with air.

The pneumatic tire 2 comprises a tread portion 2t, a pair of axially spaced bead portions 2b each with a bead core therein, a pair of sidewall portions 2s extending between the tread edges and the bead portions, a carcass 21 extending between the bead portions, and a belt 22 disposed radially outside the carcass 21 in the tread portion.

The carcass 21 comprises at least one ply 21p of cords arranged radially at an angle of 90 to 75 degrees with respect to the tire equator 2e, and extending between the bead portions 2b through the tread portion 2t and sidewall portions 2s, and turned up around the bead core 23 in each bead portion 2b from the inside to the outside of the tire so as to form a pair of turned up portions 21t and one main portion 2 1m therebetween.

The belt 22 comprises a breaker 23 and optionally a band 24.

The breaker 23 comprises at least two cross plies 23p of cords laid at an angle of from 10 to 35 degrees with respect to the tire equator. For the breaker cords, steel cords and/or high modulus organic fiber cords can be used. In this example, the breaker consists of the two cross breaker plies of steel cords.

The band 24 is composed of an organic cord or cords spirally wound on the radially outside of the breaker at almost zero degree, namely, less than 5 degrees with respect to the tire equator. For example, organic fiber cords such as nylon are used. In this example, the band is a single full width band covering the overall width of the breaker. However, a so called edge band made up of two parts covering the edge portions of the breaker only can be used alone or in combination with the full width band.

On the inside of the carcass 21, an inner liner made of air-impermeable rubber is disposed forming the almost entirety of the inner surface of the tire.

The wheel rim 3 comprises a pair of bead seats 3s for the tire beads 2b, a pair of flanges 3f extending radially outwardly from the bead seats 3s, and a rim well 3w between the bead seats 3s for tire mounting.

In order to effectively reduce tire noise during running by controlling the air resonance and damping unwanted vibrations, the noise damper 1, 1t, 1r is made form at least one kind of spongy material.

As the spongy material, for example, rubber foam and synthetic resin foam are preferably used. Especially, in view of sound absorption, open-cell type foam is preferred, but closed-cell type form can be used as well.

As to the synthetic resin foam, for example, ether based polyurethane sponge, ester based polyurethane sponge, polyethylene sponge and the like can be suitably used.

As to the rubber foam, for example, chloroprene rubber (CR) sponge, ethylene-propylene rubber (EDPM) sponge, nitrile rubber (NBR) sponge and the like can be suitably used.

In view of sound absorption, durability, light weight nature and controllability of foaming, preferably used are polyurethane sponge, especially ether based polyurethane sponge, and polyethylene sponge. For example, Product number E16 of MARUSUZU CO.,LTD. is a commercially available ether based polyurethane sponge.

Aside from such elastic material foam, unwoven fabric or web of fiber such as synthetic fiber, plant fiber, and animal fiber may be used as the spongy material, alone or in combination with the elastic material foam.

If the spongy material forming the damper has a specific gravity of less than 0.005 or more than 0.060, then the effect to control the resonance of air in tire cavity 5 tends to decrease.

Therefor, the specific gravity is set in a range of not more than 0.005, preferably more than 0.010, more preferably more than 0.016, but not more than 0.060, preferably less than 0.050, preferably more less than 0.035.

Firstly, two exemplary dampers 1 which are mainly designed to use without adhesive will be described in conjunction with FIGS. 1-7. Then, examples used together with adhesive will be described to in conjunction with FIGS. 8-11.

Noise Damper for Wheel Rim

In FIGS. 1, 2, 5 and 7, a noise damper 1 according to the present invention is to be mounted on a wheel rim 3—hereinafter, the "rim damper 1r".

The rim damper 1r is a stretchable annular body made of a spongy material, e.g. ether based polyurethane sponge.

Figure 1:
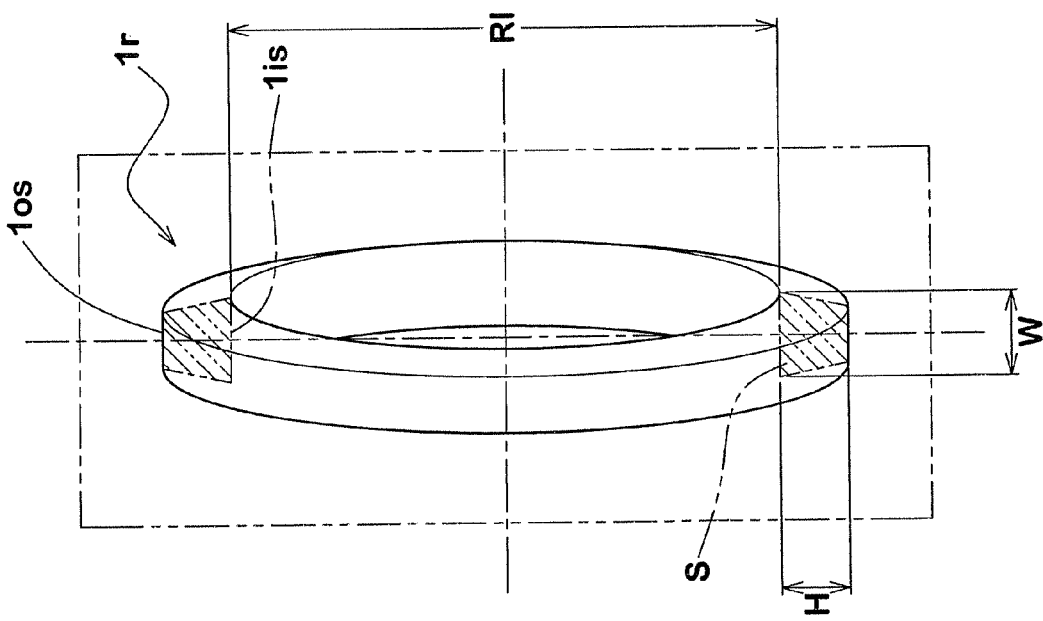
FIG. 1 is a perspective view of an annular noise damper for wheel rims (hereinafter, the "rim damper").

As shown in FIG. 1, in a cross section including the axis of rotational symmetry of the rim damper 1r under its free state, the rim damper 1r has an inside diameter RI, a radial height H, a cross-sectional area S and a base width W.

The inside diameter RI which is measured at the radially innermost end of the damper is set in a range of not less than 0.9, preferably more than 0.93, more preferably more than 0.95, but not more than 1.10, preferably less than 1.05 times the outer diameter RW of the mounting portion (3w) of the wheel rim.

In this example, as shown in FIG. 2, the rim damper 1r is disposed within the axial width of the rim well 3w.

Usually and in this example, between the bead seats 3b, the outer diameter of the wheel rim decreases toward the rim well 3w, and the minimum diameter occurs in the rim well 3w.

This minimum outer diameter is used as the above-mentioned outer diameter RW.

The radial height H which is measured from the above-mentioned radially innermost end to the radially outermost end of the damper is set in the range of not less than 0.5 cm, preferably more than 1.5 cm, more preferably more than 2.0 cm, but not more than 6.0 cm, preferably less than 5.0 cm, more preferably less than 3.5 cm.

The cross-sectional area S is set in the range of not less than 1 sq.cm, preferably more than 3 sq.cm, more preferably more than 10 sq.cm, but not more than 60 sq.cm, preferably less than 40 sq.cm, more preferably less than 30 sq.cm.

The base width W which is measured between the axial edges of the radially inner circumferential surface 1is is set in the range of not less than 1 cm, preferably more than 2 cm, more preferably more than 2.5 cm, but not more than 14 cm, preferably less than 10 cm, more preferably less than 18 cm.

The radially inner circumferential surface 1is is formed substantially cylindrical for versatility. In other words, in the cross section including the axis of rotational symmetry, the inner surface 1is is a straight line parallel to the axis even if the mounting portion of the wheel rim 3 is not straight.

For suitable fitting, however, the inner surface 1is may be provided with a profile according with that of the mounting portion.

In this example, for the stability, the damper is progressively increased in the axial width from the radially outside to the radially inside of the damper, and the above-mentioned base width W is the maximum. A sharply pointed triangular cross-sectional shape is not preferable because the damping effect decreases. Thus, the damper is formed in a substantially trapezoidal cross-sectional shape. In view of the damping effect, a shape having a constant width such as rectangle or similar is also preferred rather than a triangular shape.

By providing such dimensions, the axial movement of the rim damper 1r is restricted, and the rim damper 1r is stably held in the rim well 3w without using adhesive.

If the above-mentioned height H is less than 0.5 cm, it is difficult to control air resonance. If the height H is more than 6.0 cm, the damper 1r is very liable to be broken by the bead portion when mounting the tire on the rim.

If the sectional area S is more than 60 sq.cm, as the weight increases, the wheel balance is liable to become poor. If the sectional area S is less than 1 sq.cm, it is difficult to absorb the sound vibration energy.

If the base width W is less than 1 cm, in case of a tall damper especially, as the stability becomes low, the damper is liable to fall down when mounting the tire. If the base width W is more than 18 cm, the damper becomes flat or very thin as the sectional area S is limited as above, and as a result the damping effect decreases.

Even if the diameter RI is more than the diameter RW, by limiting RI to under 1.10×RW, the damper can stay within the rim well as the diameter of the rim gradually decreases toward the rim well. Under very high-seed conditions, however, the retention is not always adequate. Thus, to ensure the retention, it is better to set the diameter RI less than the diameter RW. By limiting RI to over 0.9×RW, relative rotation and displacement of the damper due to rapid acceleration/deceleration can be effectively prevented without getting difficulty in mounting the damper around the rim well.

As shown in FIG. 2, in case of the deep drop center rims most commonly used for passenger car tires, the above-mentioned diameter RI (cm), base width W (cm) and height H (cm) can be determined in relation to a nominal rim diameter D (inch) of the rim so as to satisfy the following conditions:

$$2.26D-2 =< RI =< 2.26D+3 \quad (1)$$

$$W =< 0.5D-0.5 \quad (2)$$

$$H =< -0.025D^2+1.13D-7 \quad (3)$$

whereby the damper can be mounted without difficulty and the displacement of the damper can be prevented.

Noise Damper for Pneumatic Tire

In FIGS. 1, 2, 5 and 7, a noise damper 1 according to the present invention is set in the pneumatic tire 2—hereinafter, the "tire damper $1t$".

The tire damper $1t$ is a compressible annular body made of a spongy material, e.g. ether based polyurethane sponge.

Figure 3:
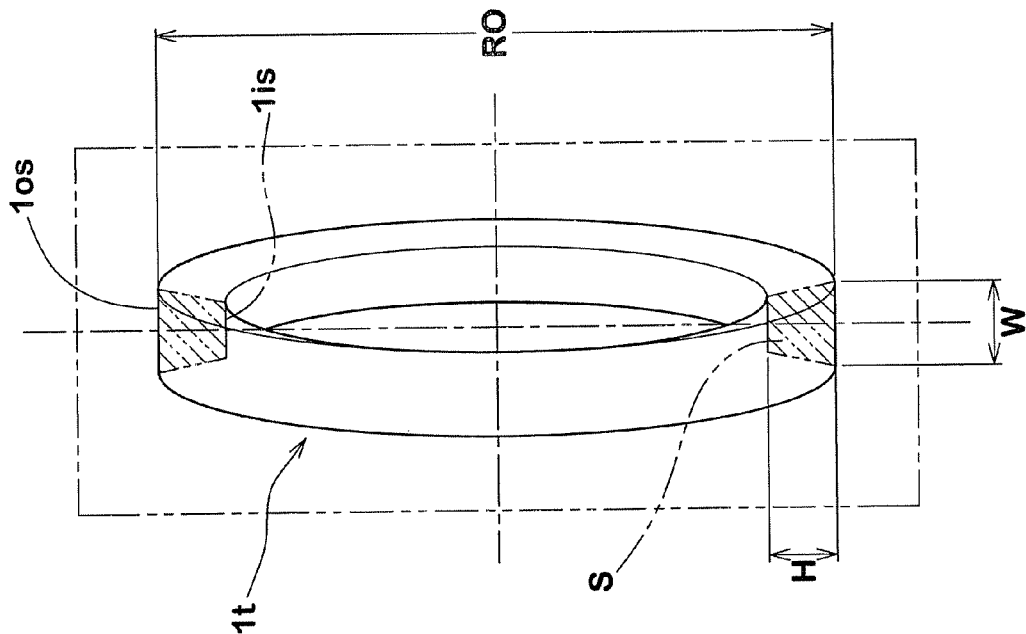
FIG. 3 is a perspective view of an annular noise damper for pneumatic tires (hereinafter, the "rim damper").

As shown in FIG. 3, in the cross section including the axis of rotational symmetry of the tire damper $1t$ under its free state, the tire damper $1t$ has an outside diameter RO, a radial height H, a cross-sectional area S and a base width W.

Figure 4:
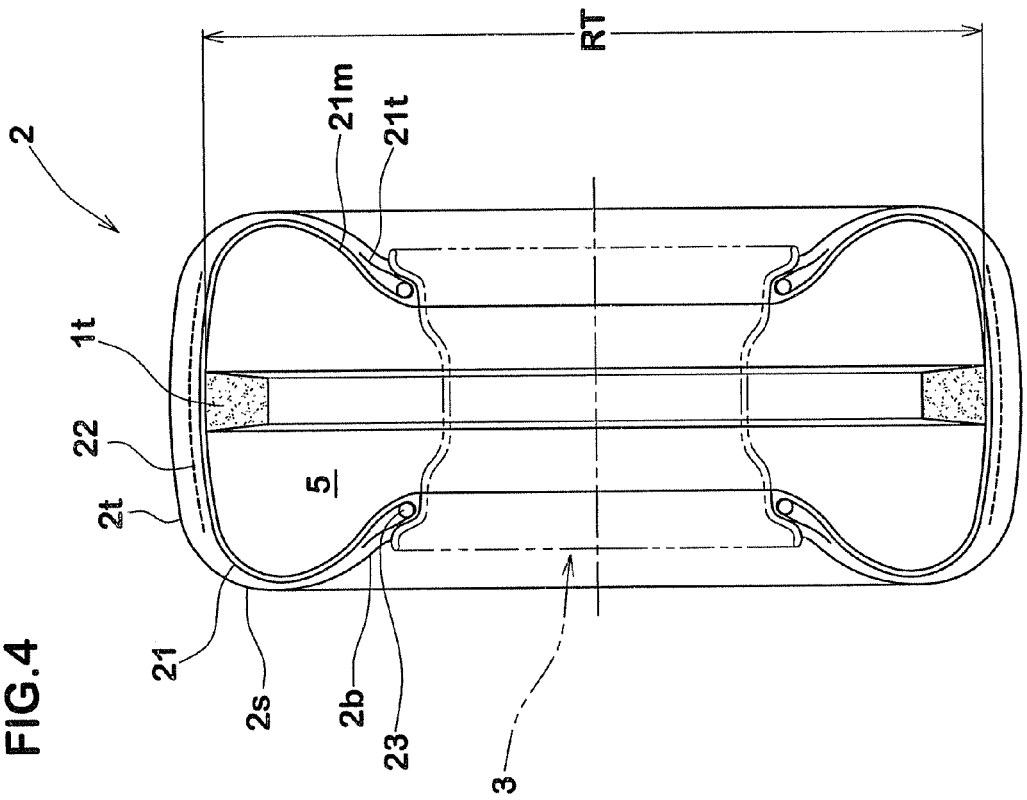
FIG. 4 is a cross-sectional view of an assembly of a pneumatic tire and the tire damper set in the tire hollow taken along a tire equatorial plane.

The outside diameter RO which is measured at the radially outermost end of the tire damper is set in the range of not less than 1.00, preferably more than 1.01, more preferably more than 1.02, but not more than 1.10, preferably less than 1.08, more preferably less than 1.05 times the inside diameter RT of the tire. The inside diameter RT is the maximum diameter of the inner circumferential surface of the tread portion $2t$. Usually and in this example, as shown in FIG. 4, the inner circumferential surface has a convex profile. Thus, the maximum diameter occurs at the tire equator or the center of the tread portion.

The radial height H which is measured from the above-mentioned radially outermost end to the radially innermost end of the damper is set in the range of not less than 0.5 cm, preferably more than 1.5 cm, more preferably more than 2.0 cm, but not more than 6.0 cm, preferably less than 5.0 cm, more preferably less than 3.5 cm.

The cross-sectional area S is set in the range of not less than 1 sq.cm, preferably more than 3 sq.cm, more preferably more than 10 sq.cm, but not more than 60 sq.cm, preferably less than 40 sq.cm, more preferably less than 30 sq.cm.

The base width W which is measured between the edges of the radially outer circumferential surface $1os$ is set in the range of more than 1 cm, preferably more than 2 cm, more preferably more than 2.5 cm, but less than 25 cm, preferably less than 14 cm, more preferably less than 10 cm.

The radially outer circumferential surface $1os$ is formed substantially cylindrical for suitable fitting.

In this example, as the damper $1t$ is progressively increased in the axial width from the radially inside to the radially outside of the damper, and the above-mentioned base width W is the maximum. For the same reason as the rim damper $1r$, a sharply pointed triangular cross-sectional shape is not preferable. Thus, the damper is formed in a substantially trapezoidal cross-sectional shape. Also a shape having a constant width such as rectangle or similar can be used too.

Therefore, by the resilience of the compressed damper material when inserted in the tire hollow 5, the outer surface of the damper and the inner surface of the tire closely contact with each other. Thus, wear of the damper is prevented, and the damper can stay stably around the original maximum diameter position.

If the outside diameter RO is less than 1.00 times the inside diameter RT, the damper easily moves relatively to the tire during running and unstable. Thus, a large displacement is very liable to occur. If more than 1.10 times, a fold or sag is caused. Thus, in either case, rotational balance is disturbed.

If the height H is less than 0.5 cm, it is difficult to control air resonance. If the height H is more than 6.0 cm, the damper $1t$ is liable to be broken when the aspect ratio of the tire is very low in particularly.

If the sectional area S is more than 60 sq.cm, as the weight increases, the wheel balance becomes poor. If the sectional area S is less than 1 sq.cm, it is difficult to absorb the sound vibration energy.

If the base width W is less than 1 cm, in case of a tall damper especially, it is liable to fall down by the centrifugal force. If the base width W is more than 25 cm, the damper becomes flat or very thin as the sectional area S is limited as above, and as a result it becomes difficult to control the air resonance.

In order to obtain optimum conditions between the above-mentioned parameters, comparison tests were conducted, and the following conditions were found: When the outer diameter RO is in a range of from about 40 cm to about 70 cm, it is preferable for the noise reducing effect that the outside diameter RO (cm) and sectional area S (sq.cm) of the tire damper $1t$ satisfy the following condition (4):

$$0.07RO-2.02 =< S =< 1.5RO-47 \quad (4)$$

This however does not mean to exclude a range: $1 =< S < 0.07RO2.02$, and a range:

$$1.5RO-47 < S =< 60.$$

Further, it is preferable for stable retention of the damper that the outer diameter RO (cm) and base width W (cm) of the tire damper $1t$ satisfy the following condition (5) while limiting the height H to a range of from 1.5 to 3.5 cm if possible:

$$W =< 0.71RO-26.66 \quad (5)$$

Figure 5:
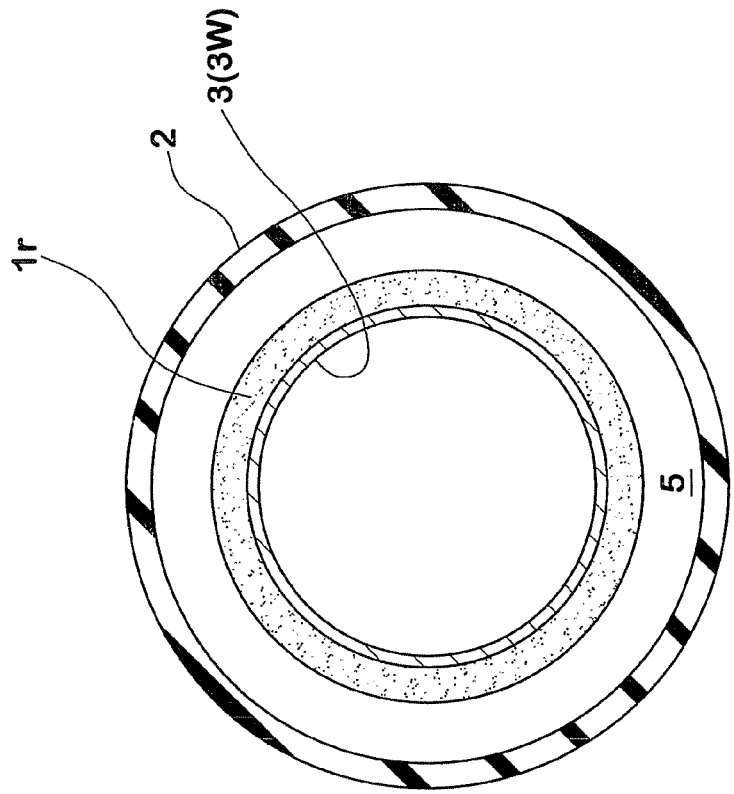
FIG. 5 is a cross-sectional view of an assembly of a tire and the wheel rim with the rim damper taken along a tire equatorial plane.

FIG. 5 shows a combination of a pneumatic tire without a tire damper $1t$ and an assembly of the wheel rim 3 and the rim damper $1r$ as shown in FIG. 2.

Figure 6:
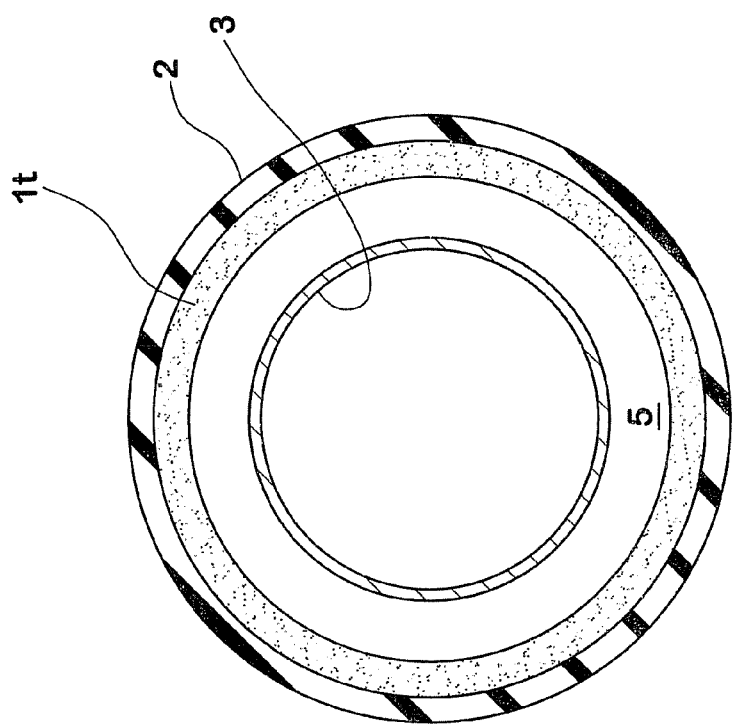
FIG. 6 is a cross-sectional view of an assembly of a wheel rim and the tire with the tire damper taken along a tire equatorial plane.

FIG. 6 shows a combination of a wheel rim 3 without a rim damper $1r$ and assembly of the pneumatic tire and the tire damper $1t$ as shown in FIG. 4.

Figure 7:
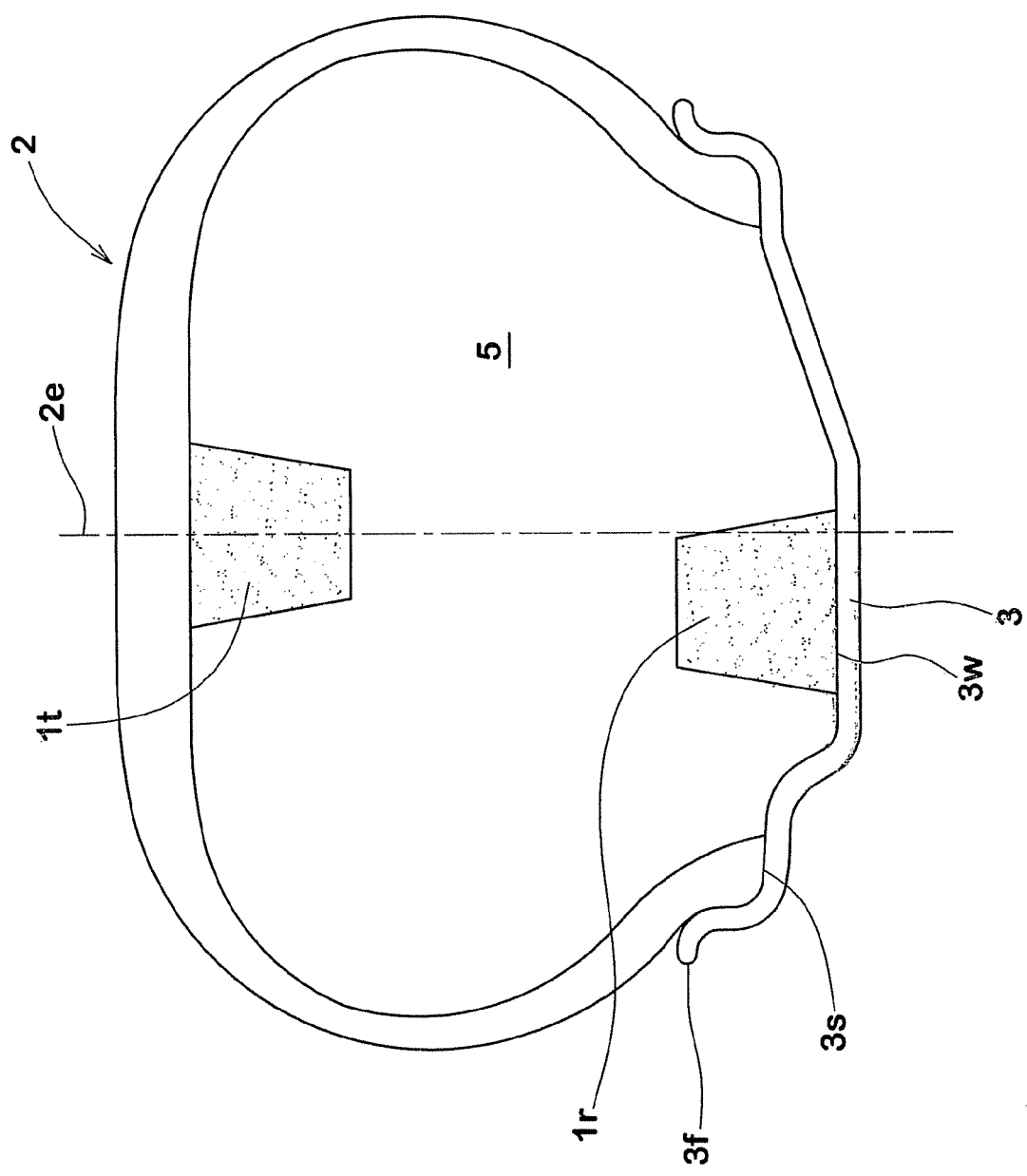
FIG. 7 is a schematic cross-sectional view of an assembly of the wheel rim with the rim damper and the tire with the tire damper

Further, as shown in FIG. 7, it is also possible to combine an assembly of the wheel rim 3 and the rim damper $1r$ as shown in FIG. 2 and an assembly of the pneumatic tire and the tire damper $1t$ as shown in FIG. 4.

Comparison test 1 (Rim Damper)

Rim dampers having various dimensions shown in Table 1 were tested for durability and noise, using an assembly of a deep drop center rim of size 15×6 and a passenger car radial tire of size 195/65R15 91H.

Durability Test:

The assembly provided with a rim damper was run for 10 minutes at a speed of 160 km/hr, using a 1.7 meter diameter drum. Then, the resultant abrasion was measured. The tire load was 6.5 kN (120% of the maximum load). The tire pressure was 200 kPa (normal pressure)

The results are indicated in Table 1 by an index based on Ref.2 being 100. The larger the index, the smaller the abrasion.

Noise Test:

The assemblies were attached to a Japanese 2000cc FF passenger car. During running on a dry asphalt road surface at a speed of 60 km/hr, noise sound was measured in the inside of the car. The measuring position was near the driver's ear on the outside or window side of the car. Measured was the sound pressure level of a peak occurring at a frequency near 240 Hz—this frequency corresponds to that of the primary resonance mode of the annular air mass in the tire cavity.

The results are indicated in Table 1 by an index based on Ref.1 being 100. The larger the index, the better the noise reduction.

Mounting Test:

Whether the mounting of the damper was easy or not was evaluated. The results are indicated in Table 1 by an index based on Ref.3 being 100. The larger the index, the easier the mounting.

Comparison Test 2 (Tire Damper)

Tire dampers having various dimensions shown in Table 2 were manufactured and tested for durability and noise, using an assembly of a deep drop center rim of size 15×6 and a passenger car radial tire of size 195/65R15 91H.

Durability Test:

Using a 1.7 meter dia. drum, the tire/rim assembly provided with a tire damper was run for 20000 km at a speed of 100 km/hr. Then, the resultant abrasion was measured. The tire load was 6.5 kN (120% of the maximum load). The tire pressure was 200 kPa (normal pressure). The results are indicated in Table 2 by an index based on Ref.2 being 100. The larger the index, the smaller the abrasion.

Noise Test:

Same as above. The results are indicated in Table 2 by an index based on Ref.1 being 100. The larger the index, the better the noise reduction.

Mounting Test:

Same as above. The results are indicated in Table 2 by an index based on Ref.3 being 100. The larger the index, the easier the mounting.

TABLE 1

| | Tire-rim assembly | | | | | | | | |
|---|---|---|---|---|---|---|---|---|---|
| | Ex. 1 | Ex. 2 | Ex. 3 | Ex. 4 | Ex. 5 | Ref. 1 | Ref. 2 | Ref. 3 | Ref. 4 |
| Tire damper | non | non | non | non | non | none | non | non | non |
| Rim damper | provided | provided | provided | provided | provided | none | provided | provided | provided |
| Material *1 | ET-PUR | ET-PUR | ET-PUR | ET-PUR | ET-PUR | — | ET-PUR | ET-PUR | ET-PUR |
| Specific gravity | 0.016 | 0.016 | 0.016 | 0.016 | 0.016 | — | 0.016 | 0.016 | 0.016 |
| R/Rt | 0.97 | 1.04 | 1.1 | 0.9 | 0.97 | — | 0.85 | 1.15 | 0.97 |
| R (cm) | 34 | 36 | 39 | 32 | 34 | — | 30 | 40 | 34 |
| Sectional area S (sq. cm) | 20 | 20 | 20 | 20 | 19.8 | — | 20 | 20 | 100 |
| Height H (cm) | 4 | 4 | 4 | 2 | 6 | — | 4 | 4 | 10 |
| Width W (cm) | 5 | 5 | 5 | 10 | 3.3 | — | 5 | 5 | 10 |
| Sectional shape | rectangle | rectangle | rectangle | rectangle | rectangle | — | rectangle | rectangle | rectangle |
| Meet Eq.(1)? *2 | Yes | Yes | No | Yes | Yes | — | No | No | Yes |
| Meet Eq.(2)? *3 | Yes | Yes | Yes | No | Yes | — | Yes | Yes | No |
| Meet Eq.(3)? *4 | Yes | Yes | Yes | Yes | No | — | Yes | Yes | No |
| Test Resuls | | | | | | | | | |
| Noise | 120 | 120 | 120 | 110 | 130 | 100 | — | 120 | — |
| Durability | no damage | no damage | slight wear | no damage | no damage | — | — | broken | — |
| Mounting | 120 | 120 | 120 | 100 | 100 | — | bkoken | 100 | Tire could not be mounted |

*1 ET-PUR: Ether based polyurethane sponge

*2 $2.26D - 2 = 31.9$ and $2.26D + 3 = 36.9$.

*3 $0.5D - 0.5 = 7.0$

*4 $-0.025D^2 + 1.13D - 7 = 4.3$

TABLE 2

| | Tire-rim assembly | | | | | | | | |
|---|---|---|---|---|---|---|---|---|---|
| | Ex. 1 | Ex. 2 | Ex. 3 | Ex. 4 | Ex. 5 | Ref. 1 | Ref. 2 | Ref. 3 | Ref. 4 |
| Rim damper | non provided | non provided | non provided | non provided | non provided | none | non provided | non provided | non provided |
| Tire damper | non provided | non provided | non provided | non provided | non provided | none | non provided | non provided | non provided |
| Material *1 | ET-PUR | ET-PUR | ET-PUR | ET-PUR | ET-PUR | — | ET-PUR | ET-PUR | ET-PUR |
| Specific gravity | 0.16 | 0.16 | 0.16 | 0.16 | 0.16 | — | 0.16 | 0.16 | 0.16 |
| R/Rt | 1 | 1.03 | 1.06 | 1.1 | 1.08 | — | 0.95 | 1.15 | 1 |
| Sectional area S (sq. cm) | 21 | 21 | 21 | 36 | 50 | — | 21 | 21 | 70 |
| Height H (cm) | 3 | 3 | 3 | 2 | 6 | — | 3 | 3 | 10 |
| width W (cm) | 7 | 7 | 7 | 18 | 5 | — | 7 | 7 | 7 |
| Meet Eq.(4)? *2 | Y | Y | Y | Y | X | — | Y | Y | X |
| Meet Eq.(5)? *3 | Y | Y | Y | X | Y | — | Y | Y | Y |
| Test Resuls | | | | | | | | | |
| Noise | 110 | 110 | 110 | 115 | 130 | 100 | 110 | 110 | 130 |
| Durability | 110 | 110 | 120 | 120 | 120 | — | 100 | 120 | 110 |
| Mounting | 120 | 120 | 120 | 120 | 100 | — | 120 | 100 | 60 |

*1 ET-PUR: Ether based polyurethane sponge
*2 0.07RO − 2.02 = 2.2 and 1.5RO − 47 = 43.0
*3 0.71RO − 26.66 = 15.9

As to the method of manufacturing the rim damper 1*r* and tire damper 1*t*, the dampers can be molded as a seamless ring. Further, the dampers can be formed by jointing the ends of a strip or bar of the spongy material by means of adhesive agent, double-stick tape, heat bonding or the like.

As explained above, the point of the former two examples is to substantially fix the damper by means of a frictional force between the damper and the tire or rim enhanced by the resilience of the elastic deformation of the damper, without utilizing adhesive. However, in order to ensure the fixation or facilitate the positioning, adhesive, e.g. double-sided adhesive tape can be applied to one or more circumferential positions on the damper, tire and/or rim.

Noise Damper for High-speed Pneumatic Tire

The above-mentioned tire damper 1*t* is basically not fixed to the tire by means of adhesive. When the speed is under 210 km/h (H-speed rating), the damper can stay in place by means of resilience of elastic body. But, above 240 km/h such as V-, W-, Y-, ZR-speed ratings, relative movement of the noise damper to the tire and the resultant frictional heat generation are increased, and thus durability of the tire decreases. Therefore, under very-high-speed conditions, the tire noise damper has to be fixed to the tire using adhesive. Upon fixing, the friction between the damper and tire is decreased, but, the internal friction is not decreased. Therefore, under very-high-speed conditions, the problem of temperature rise due to the internal friction arises. If the temperature becomes excessively high, the cord/rubber separation failure is liable to occur, and high-speed durability decreases. Furtherer, under very high speed conditions, as the centrifugal force of the damper becomes not negligible, the ground pressure increases partially of the tread surface. This becomes a factor of uneven tread wear.

For the tire noise damper, in view of weight balance, it is preferable that a damper is disposed at the tread center (tire equatorial plane) or dampers are disposed symmetrically about the tire equatorial plane.

On the other hand, for the high-speed low-aspect pneumatic tire, it is preferred that the tread portion is provided with a number of inclined lateral grooves extending from the tread center region to the tread edges, and a straight rib disposed in the tread center in order to provide sufficient drainage and steering stability at the same time.

If the damper overlaps with a circumferential rib in the tire axial direction, the heat coming from the tire damper is accumulated in the rib, and further by the increased ground pressure, the heat generation of the rib is increased.

In the following embodiment, therefore, a compensation groove CG having a specific dimension is provided in the tread portion 2*t* of the tire in order to increase the outgoing radiation without deteriorating other performances. Thus, the following invention is suitably applied to a pneumatic tire of W-speed rating or higher.

Therefore, another object of the present invention is to provide a pneumatic tire with a noise damper fixed thereto, in which temperature rise, uneven tread wear, deterioration in durability under very high-speed conditions can be effectively prevented.

Figure 8:
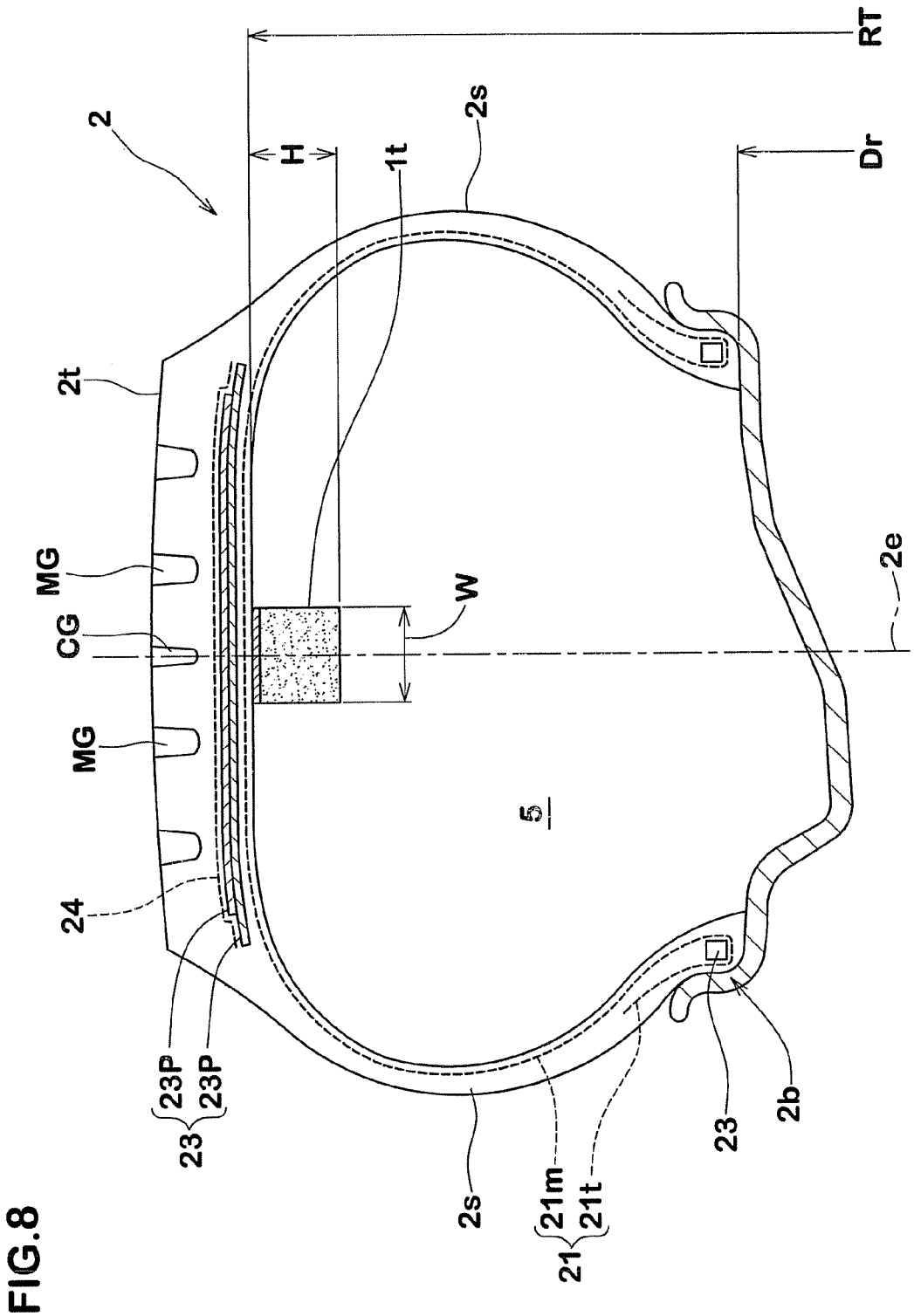
FIG. 8 is a cross-sectional view of an assembly of a wheel rim, a pneumatic tire and a high-speed-tire noise damper.
Figure 9:
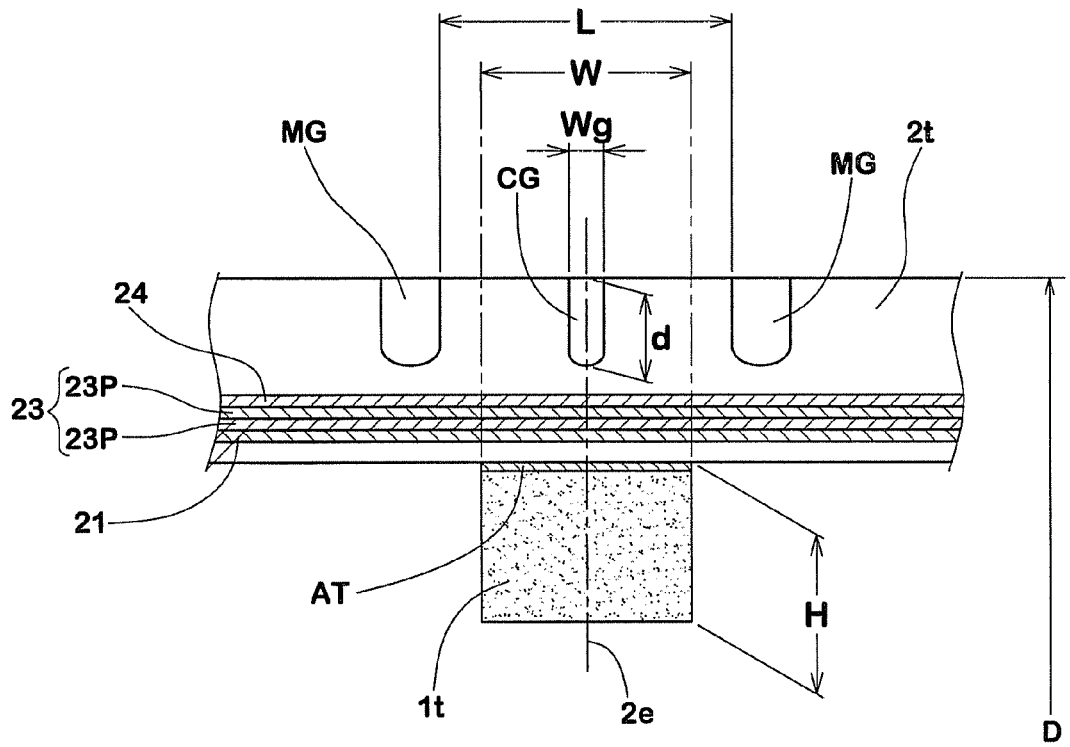
FIG. 9 is an enlarged cross-sectional view of the high-speed-tire noise damper.
Figure 10:
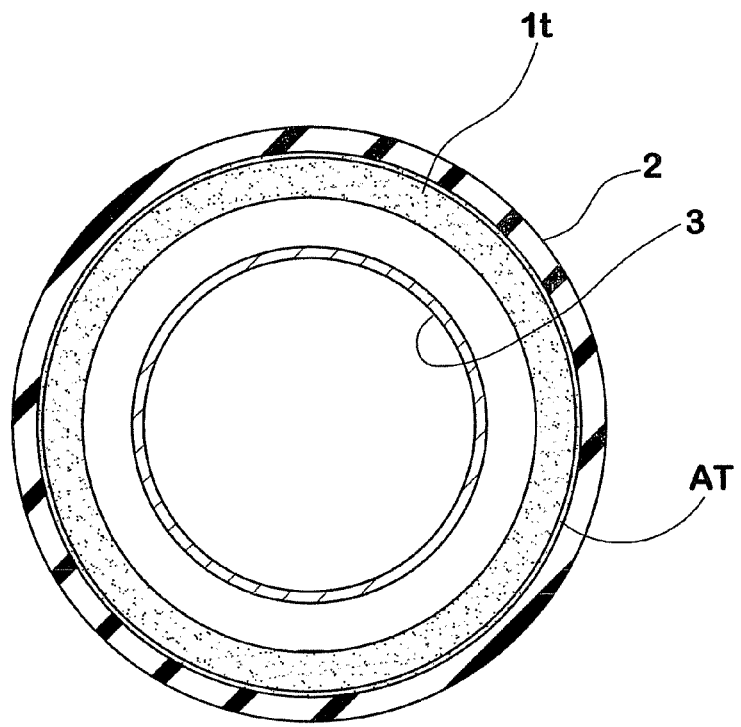
FIG. 10 is a cross-sectional view of the assembly taken along a tire equatorial plane.

As shown in FIGS. 8, 9 and 10, in this embodiment, the above-mentioned tire damper 1*t* is fixed to the inner surface of the tread portion 2*t* by means of adhesive, e.g. an adhesive agent such as synthetic-rubber-based adhesive and/or a double-sided adhesive tape.

Even in the former embodiments, it is possible to apply an adhesive to the interface between the damper and tire as explained above. But the application is only partial. In contrast thereto, in this embodiment, the adhesive is applied to the overall length of the damper.

In this example, a double-sided adhesive tape AT is used. The tape AT can be applied to the tire or damper in advance of mounting of the damper. In this example, the tape is applied to the tire inner surface along the center line 2*e* or tire equator and then the annular tire damper 1*t* is set on the tape as shown in FIG. 9.

The above-mentioned compensation groove CG is disposed in the outer surface of the tread portion 2 so as to extend along the tire damper 1*t* continuously in the tire circumferential direction. In this example, as shown in FIG. 8, as the tire damper 1*t* is disposed at the center (tire equatorial plane), the compensation groove CG extends on the tire equator C. Therefore, as the surface area is increased by the groove CG, the radiation of heat is promoted, the temperature rise in the vicinity of the groove is prevented. Further, as the weight of the tread rubber corresponding to the groove volume is decreased, it is possible to balance with an increase in the weight of the tire damper. Therefore, heat generation and uneven wear resulting from the increase in the ground pressure can be reduced.

For that purpose, it is preferable that the compensation groove CG satisfies the following condition (6):

$$Scg \geq (M1+M2)/(G \times D \times pi) \qquad (6)$$

wherein

Scg is the sectional area (sq.cm) of the compensation groove CG,
M1 is the mass (gram) of the damper,
M2 is the mass (gram) of the adhesive,
G is the specific gravity (gram/cu.cm) of the tread rubber,
D is the tire diameter (cm) at the tire equator, and
pi=3.14159 - - - .

Further, if the sectional area Scg of the compensation groove CG is too wide, tire performances such as steering stability are liable to deteriorate. It is thus, preferable that the value K obtained from the following equation (2) is limited to at most 1.5, preferably under 1.2.

$$K = Scg/\{(M1+M2)/(G \times D \times pi)\} \qquad (2)$$

For the heat radiation, it is preferable that the depth (d) of the compensation groove CG is set in the range of not more than 2.5 times the groove width Wg, but not less than 4.0 mm, namely, 2.5Wg>=d>=4.0 mm. The groove width W is preferably set in the range of not more than 20.0 mm.

The compensation groove CG is located within the axial width of the damper 1t, and it is preferable that the groove center coincides with the center of the noise damper 11 in the tire axial direction.

Thus, in this example, the damper and the compensation groove CG are centered on the tire equator. As the damper extends straight at the center (equator), the compensation groove CG is also extended straight. But, it is also possible to use a zigzag groove as far as the center of the zigzag runs within the axial width of the damper.

In this embodiment, further, a pair of circumferentially extending main grooves MG are disposed one on each side of the compensation groove CG or the tire equator C. The main grooves MG are provided for drainage purpose and wider than the compensation groove CG. The axial distance L between the maim grooves MG is more than the base width W of the noise damper 11, but less than about 2 times the base width W. As a result, the effect of the compensation groove CG is further enhanced.

In this embodiment, like the former embodiments, the tire damper 1t is already annular before setting in the tire hollow 5.

Figure 11:
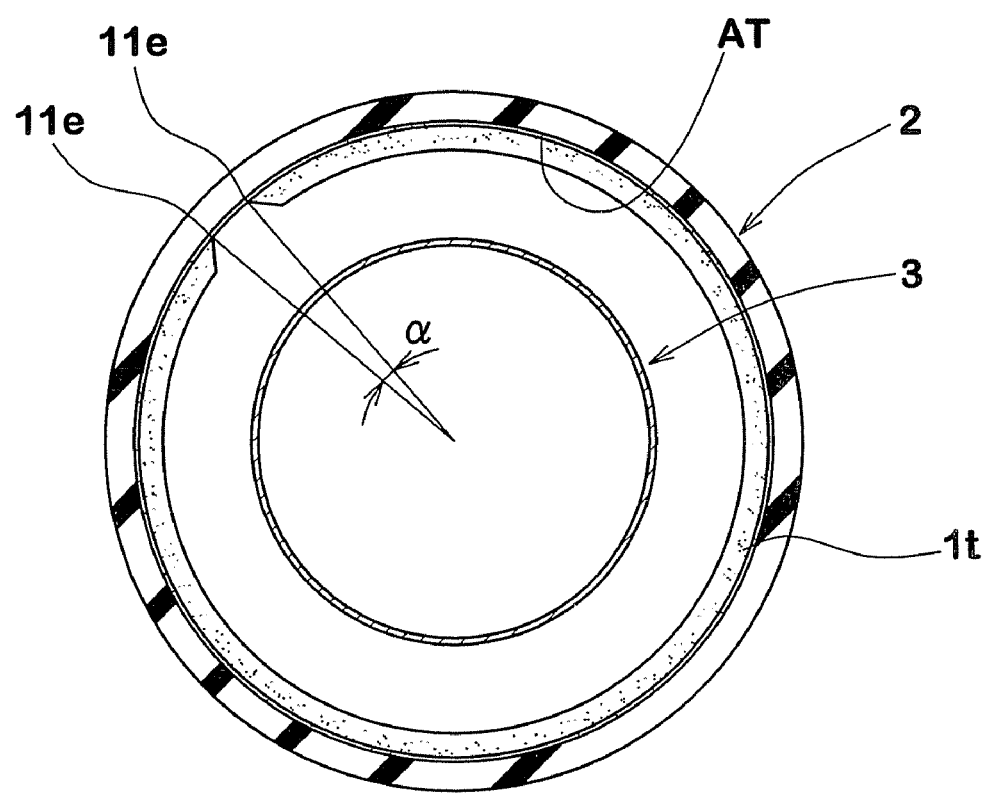
FIG. 11 is a cross-sectional view of another high-speed-tire noise damper.

But, as shown in FIG. 11, the spongy material in a form of long strip can be used. For example, a double-sided adhesive tape is applied to one side (base side) of the strip in advance, and removing the release-coated paper, the strip is applied to the inner surface of the tire. In the state that the damper 1t is fixed to the tire, it is desirable that the gap between the circumferential ends of the tire damper 1t is as small as possible and jointed each other. But, in order to improve the working efficiency, this jointing operation may be omitted by intentionally providing a small gap and shaping the ends as shown in FIG. 11. As to the shape, each end is tapered at about 45 degrees, namely, in a range of 45+/−10 degrees. As to the gap, the opening angle alpha between the tip ends 11e is less than 60 degrees, preferably less than 10 degrees, more preferably less than 5 degrees. As a result, even when the tread portion is greatly deformed, direct contact and the resultant wear and separation failure of the ends can be prevented although the ends are not jointed each other. Excepting the tapered end portions, the strip has a substantially constant cross-sectional shape such as trapezoid and rectangle as explained above.

The radial height H is in a range of more than 30%, preferably more than 50%, but less than 160%, preferably less than 120% of the base width W.

The volume V2 of the tire damper is set in the range of 0.4 to 20% of the volume V1 of the cavity 5 of the tire when mounted on the rim and inflated to 200 kPa in case of passenger tires or the maximum tire pressure in case of others.

** Comparison Tests (Tire Damper for High-speed Tire)

High-speed radial tires of size 215/45R17 (Rim size 17×7JJ) having the structure shown in FIG. 8 and the specifications shown in Table 3 were made and tested for noise performance and high-speed durability.

The noise damper 1t was made of an ether based polyurethane sponge (product number E16 of MARUSUZU CO., LTD.) having a specific gravity of 0.016, a height H of 24 mm and a base width W of 60 mm. The sectional shape was rectangle, and the circumferential ends were tapered at 45 degrees as shown in FIG. 9, and a gap corresponding to an opening angle alpha of about 2 degrees was provided between the ends. The volume V2 of each damper was 2635 cm$^3$. The volume V1 of the tire cavity was 35320 cm$^3$. Thus, V2/1V=0.104.

The mass M1 of the damper was 42.2 g, and the mass of the adhesive tape used was 19.9 g. The noise damper was fixed to the tire with a double-sided adhesive tape (product number 5000NS of Nitto Denko Corporation).

Noise Performance Test:

The assemblies were attached to a Japanese 2500cc FR. passenger car. (Tire inflation pressure: 200 kPa)

During running on a dry asphalt road surface at a speed of 60 km/hr, noise sound was measured in the inside of the car. The measuring position was near the driver's ear on the outside or window side of the car. Measured was the sound pressure level of a peak occurring at a frequency near 240 Hz—this frequency corresponds to that of the primary resonance mode of the annular air mass in the tire cavity. The results are indicated in Table 3 in dB based on Cont. being 0 dB.

High-speed Durability Test:

The durability of these tires were tested according to Step speed test conforming to ECE30. The results are shown in Table 3 wherein the speed (km/hr) at which the tire was broken and the running time (minute) at that speed are shown.

TABLE 3

|  | Tire-rim assembly | | | | | |
| --- | --- | --- | --- | --- | --- | --- |
|  | Cont | Ref. 1 | Ex. 1 | Ex. 2 | Ex. 3 | Ex. 4 |
| Rim damper | non | non | non | non | non | non |
| Tire damper | non | provided | provided | provided | provided | provided |
| Compensation groove | non | non | provided | provided | provided | provided |

TABLE 3-continued

|  | Tire-rim assembly | | | | | |
|---|---|---|---|---|---|---|
|  | Cont | Ref. 1 | Ex. 1 | Ex. 2 | Ex. 3 | Ex. 4 |
| Depth d (mm) | — | — | 7.5 | 7.5 | 8.2 | 8.2 |
| Width Wg (mm) | — | — | 3.6 | 3.6 | 4 | 4.8 |
| Sectional area Scg (sq. mm) | 0 | 0 | 27 | 27 | 32.8 | 39.36 |
| K (*1) | 0 | 0 | 1 | 1 | 1.2 | 1.5 |
| Main grooves' distance L (mm) | 25 | 25 | 25 | 35 | 35 | 35 |
| Test results |  |  |  |  |  |  |
| Noise performance (dB) | 0 | −8.2 | −8.1 | −8.1 | −8 | −8.2 |
| High-speed durability (km/hr-min) | 300-12 | 280-3 | 290-7 | 280-18 | 290-11 | 300-3 |

(*1) $K = Scg/\{(M1 + M2)/(G \times D \times pi)\}$

From the test results, it was confirmed that the high-speed durability can be effectively improved without sacrificing the noise reducing effect.

The invention claimed is:

1. A noise damper in combination with a pneumatic tire, comprising an annular body disposed in a tire hollow, wherein the axial width of the annular body is constant or alternatively gradually decreases from the radially outer end towards the radially inner end, and the annular body is made of a spongy material having
a specific gravity of from 0.005 to 0.060,
a cross sectional area (S) of from 1 to 60 cm$^2$,
a radial height (H) of from 0.5 to 6.0 cm,
a base width (W) at the radially outer end of from 1 to 25 cm, and wherein said annular body has no ends forming a junction and has an outside diameter (RO) of from 1.01 to 1.10 times the maximum inside diameter (RT) of the tire hollow, whereby the noise damper is substantially fixed to the inside of the pneumatic tire by means of an interference fit there between without utilizing an adhesive agent.

2. The noise damper in combination with a pneumatic tire according to claim 1, wherein the radial height (H) is in a range of from 1.5 to 3.5 cm, and the base width (W) is in a range of from 2.5 to 10 cm.

3. The noise damper in combination with a pneumatic tire according to claim 1 or 2, wherein said outside diameter (RO) in cm, base width (W) in cm and cross sectional area (S) in sq.cm satisfy the following conditions:

$0.07RO-2.02 = <S = <1.5RO-47$ and $W = <0.71RO-26.66.$

4. The noise damper in combination with a pneumatic tire according to claim 3, wherein said spongy material is an ether based polyurethane sponge.

5. The noise damper in combination with a pneumatic tire according to claim 1 or 2, wherein said spongy material is an ether based polyurethane sponge.

* * * * *